United States Patent [19]
Niwa et al.

[11] Patent Number: 5,516,467
[45] Date of Patent: May 14, 1996

[54] PROCESS FOR PRODUCING A TINTED CONTACT LENS

[75] Inventors: Kazuharu Niwa; Yoshitaka Taniyama; Noriko Iwata; Yasuhiro Yokoyama, all of Nagoya, Japan

[73] Assignee: Menicon Co., Ltd., Nagoya, Japan

[21] Appl. No.: 275,529

[22] Filed: Jul. 15, 1994

[30] Foreign Application Priority Data

Jul. 16, 1993 [JP] Japan ................................ 5-176814

[51] Int. Cl.$^6$ ................................................ B29D 11/00
[52] U.S. Cl. ................................................ 264/1.1; 8/507
[58] Field of Search .................... 264/1.1, 1.7; 8/507, 8/453, 461, 465

[56] References Cited

U.S. PATENT DOCUMENTS

| | | | |
|---|---|---|---|
| 4,640,805 | 2/1987 | Neefe | 264/1.1 |
| 4,719,657 | 1/1988 | Bawa | 8/507 |
| 4,898,695 | 2/1990 | Doshi . | |

FOREIGN PATENT DOCUMENTS

| | | |
|---|---|---|
| 0122771 | 10/1984 | European Pat. Off. . |
| 0396376 | 11/1990 | European Pat. Off. . |
| 0480049 | 4/1992 | European Pat. Off. . |
| WO92/11407 | 7/1992 | WIPO . |

OTHER PUBLICATIONS

Patent Abstracts Of Japan, vol. 14, No. 86 (C–0690), Feb. 19, 1990, JP–A–01 299 560, Dec. 4,1989.
Patent Abstracts Of Japan, vol. 12, No. 148 (C–493), May 7, 1988, JP–A–62 265 357, Nov. 18, 1987.

*Primary Examiner*—Mathieu D. Vargot
*Attorney, Agent, or Firm*—Oblon, Spivak, McClelland, Maier & Neustadt

[57] ABSTRACT

A process for producing a tinted contact lens, which includes dissolving a soluble vat dye in a monomer capable of dissolving the soluble vat dye therein, mixing the monomer having the soluble vat dye dissolved therein and other monomers, polymerizing the monomer mixture and processing the resulting polymer into a shape of a contact lens.

10 Claims, No Drawings

PROCESS FOR PRODUCING A TINTED CONTACT LENS

The present invention relates to a process for producing a tinted contact lens. More particularly, it relates to a process for producing a tinted contact lens, whereby uniform tinting can be carried out at the time of polymerizing monomers.

Tinting of contact lenses is effective not only for protecting the eyes of users from strong light rays but also for cosmetic purposes or for handling efficiency by distinction. In recent years, researches for tinting contact lenses have been conducted from such viewpoints, and vat dyes have been used as main coloring agents which are generally believed to have the highest fastness and be excellent in the safety, from a viewpoint such that they are free from discoloration or elution of the coloring agents and they are physiologically and physically safe. However, the solvent resistance which is usually regarded as a merit of such vat dyes, leads to a drawback such that the vat dyes are hardly soluble in starting material monomers for contact lenses.

Therefore, for tinting with a vat dye, it has been common to employ a method wherein the vat dye is converted in a reducing bath to a soluble leuco form, which is then impregnated to an object to be tinted, followed by oxidation treatment for fixing.

As a technique in which the above method is applied to a contact lens, a method is known which is disclosed in Japanese Unexamined Patent Publication No. 206453/1984. The method comprises immersing a water-absorptive plastic segment or a shaped soft contact lens in its hydrogel state in a dyeing solution containing a soluble vat dye to impregnate the dye thereto and then applying oxidation treatment to insolubilise the dye. Such a method is a quite common method as a dyeing method using a vat dye.

In addition to such a method, a method disclosed in Japanese Unexamined Patent Publication No. 173721/1990, is known as an example in which a similar method is applied to a water-absorptive soft contact lens in its xerogel state for the purpose of simplifying the process and avoiding color shading.

Both of the above methods have a common feature that the lenses are post-treated for dyeing. This is believed to be attributable to the fact that methods for dyeing with vat dyes or solubilised vat dyes are widely known in the fiber industry, and post-dyeing methods have become common, since vat dyes and solubilised vat dyes are hardly soluble in starting material monomers which are commonly employed.

However, such methods have a drawback that the dyeing process steps are cumbersome. Not only that, they have a problem that it is difficult to control the tinted color density or to obtain a uniformly tinted surface without color shading, and it is likely to have poor yield of good products.

Further, as a method for simply dyeing contact lenses, a method may be conceivable wherein a dye is dissolved in a monomer solution, followed by polymerization. However, a disperse dye or an oil-solubilised dye which is readily soluble in the monomer solution, is likely to be discolored by cleaning treatment or boiling treatment. Not only that, such a dye is likely to deteriorate the material of the contact lenses.

The present invention has been made in view of the above described prior art, and it is an object of the present invention to provide a contact lens which is uniformly tinted without color shading and which is not susceptible to discoloration even when subjected to cleaning treatment or boiling treatment.

Thus, the present invention provides a process for producing a tinted contact lens, which comprises dissolving a solubilised vat dye in a monomer capable of dissolving the solubilised vat dye therein, mixing the monomer having the solubilised vat dye dissolved therein and other monomers, polymerizing the monomer mixture and processing the resulting polymer into a shape of a contact lens.

Now, the present invention will be described in detail with reference to the preferred embodiments.

As mentioned above, according to the process for producing a tinted contact lens of the present invention, a solubilised vat dye is dissolved in a monomer capable of dissolving the solubilised vat dye therein, then the monomer having the solubilised vat dye dissolved therein and other monomers are mixed, the mixed monomers are polymerized, and the resulting polymer is processed into a shape of a contact lens, to obtain a tinted contact lens.

Thus, in the present invention, using a monomer capable of dissolving the solubilised vat dye, the soluble-vat dye is preliminarily dissolved in the monomer, and then the monomer is used as mixed with other monomers, whereby it is possible to obtain a contact lens which is uniformly tinted without color shading and which is not susceptible to discoloration even when subjected to cleaning treatment or boiling treatment.

The solubilised vat dye to be used in the present invention is not particularly limited. However, its typical example may be an alkali metal salt of a leuco sulfate ester of a vat dye. A specific example thereof may be an alkali metal salt of a leuco sulfate ester of a vat dye selected from the group consisting of anthraquinone, anthrone, indigo and thioindigo.

Specific examples of the solubilised vat dye include the following dyes:

The solubilized leuco sulfate ester of 7,16-Dichloro-6,15-dihydro-5,9,14,18-anthrazinetetrone (C.I. Vat Blue 6), 16,23-Dihydrodinaphtho[2,3-a:2',3'-i]naphth[2', 3':6:7]indole[2,3-c]carbazole-5,10,15,17,22,24-hexone (C.I. Vat Brown 1), N,N'-(9,10-Dihydro-9,10-dioxo-1,5-anthracenediyl)bis-benzamide (C.I. Vat Yellow 3), 16,17-Dimethoxydinaphtho[1,2,3-cd:3',2',1'-1n]perylene-5,10-dione (C.I. Vat Green 1), 6-Ethoxy-2-(6-ethoxy-3-oxobenzo[b]thien-2(3H)-ylidene)benzo[b]thiophen-3(2H)-one (C.I. Vat Orange 5) etc.

However, the solubilised vat dye useful in the present invention is not limited to such specific examples.

The amount of the solubilised vat dye to be blended may suitably be adjusted depending upon the desired color tone of the tinted contact lens and is not particularly limited. However, it is usually preferably adjusted within a range of from 0.01 to 1 wt %, more preferably from 0.03 to 0.3 wt %, relative to the total monomers to be polymerized.

Usual soft contact lenses are prepared by using, as constituting components, a hydrophilic monomer such as 2-hydroxyethyl methacrylate or methacrylic acid in order to increase the water absorptivity and a hydrophobic monomer such as methyl methacrylate or a crosslinking agent such as ethylene glycol dimethacrylate in order to impart mechanical strength. However, the solubilised vat dye does not dissolve in such a monomer mixture very well.

Whereas, as a result of the research conducted by the present inventors, it has been found that when the solubilised vat dye is preliminarily dissolved in a certain specific monomer capable of dissolving the dye therein and the monomer is mixed with other monomers, as mentioned above, it is possible to uniformly dissolve (disperse) the solubilised vat dye in the monomer mixture for polymerization.

As a specific example of the monomer capable of dissolving the solubilised vat dye therein, a hydrophilic monomer such as N,N-dimethyl (meth)acrylamide may be mentioned.

The monomer capable of dissolving the solubilised vat dye is incorporated in an amount sufficient to dissolve the solubilised vat dye and to obtain a tinted contact lens. The upper limit of the amount of the monomer capable of dissolving the solubilised vat dye is suitably adjusted depending upon the nature of the desired contact lens. However, if the amount is too much, the water absorptivity tends to be high, and the dimensional stability upon absorption of water tends to be poor. Therefore, it is preferably not more than 95 wt %, more preferably not more than 85 wt %, relative to the total monomers to be subjected to polymerization. The lower limit of the amount of the hydrophilic monomer is preferably at least 10 wt %, more preferably at least 20 wt %, relative to the total monomers to be subjected to polymerization, to obtain adequate tinting.

Said other monomers are not particularly limited. Their typical examples include hydrophilic monomers such as N-vinyl-2-pyrrolidone, 2-hydroxyethyl (meth)acrylate and (meth)acrylic acid; hydrophobic monomers such as methyl (meth)acrylate, styrene, t-butylstyrene, trifluoroethyl (meth)acrylate, hexafluoroisopropyl (meth)acrylate and tris(trimethylsiloxy)silylpropyl (meth)acrylate; and crosslinkable monomers such as ethylene glycol di(meth)acrylate, allyl (meth)acrylate, divinylbenzene and vinylbenzyl (meth)acrylate.

For the polymerization of the above monomer mixture, a polymerization initiator is used. As such a polymerization initiator, azobisisobutyronitrile, azobisdimethylvaleronitrile, benzoyl peroxide, t-butyl hydroperoxide or cumene hydroperoxide may, for example, be mentioned. However, the initiator useful in the present invention is not limited to such specific examples.

The amount of the polymerization initiator to be incorporated is not particularly limited, and it is usually from 0.001 to 2 parts by weight, per 100 parts by weight of the total monomers to be subjected to polymerization.

Thus, it is possible to obtain a contact lens material having the solubilised vat dye uniformly dispersed. Then, the contact lens material is processed by e.g. cutting and grinding into a shape of a contact lens.

The contact lens thus obtained by such processing is then immersed in water such as deionized water, followed by boiling (swelling and hydration treatment) to obtain a well tinted contact lens. By such swelling and hydration treatment, the leuco compound formed from the solubilised vat dye will be converted by boiling to a vat dye.

An example of such a reaction will be shown below. Namely, if a solubilised vat dye of the following formula:

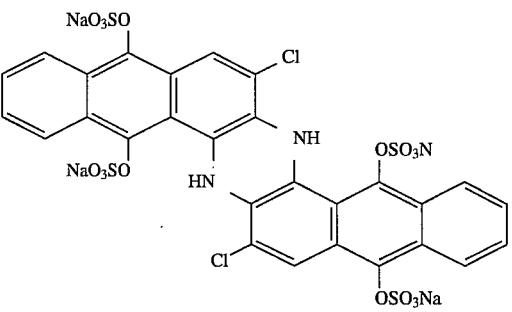

is taken as an example, such a solubilised vat dye is converted via a leuco compound of the formula:

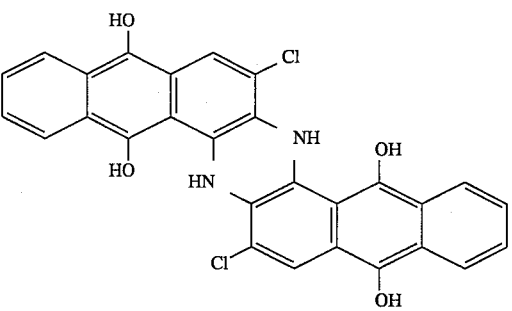

to a vat dye (tinted state) of the formula:

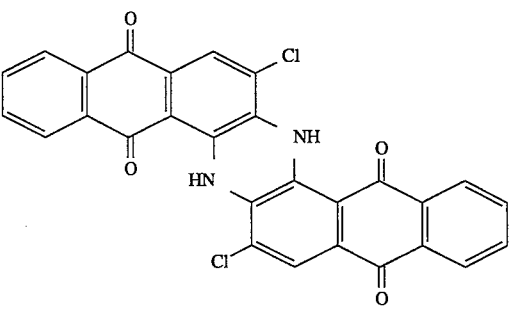

during the blending-polymerization-processing into a lens, and then when subjected to e.g. boiling, it will be completely converted to the vat dye (tinted state) and fixed.

In the present invention, not only the method of applying swelling and hydration treatment, but also other methods may be employed to convert the solubilised vat dye or the leuco compound contained in the contact lens to the vat dye as its oxidized form, such as a method of treating the contact lens with an acid such as sulfuric acid, hydrochloric acid, nitric acid or acetic acid, a method of treating the contact lens with an oxidizing agent, e.g. a permanganate sodium nitrite, a peroxide such as hydrogen peroxide, various alkali metal salts or various metal oxides, and a method of irradiating ultraviolet rays to the contact lens by means of an UV lamp or an UV irradiating apparatus.

In the above-mentioned method of treating the contact lens with an oxidizing agent, it is particularly advantageous to employ hydrogen peroxide, since it is thereby possible to simultaneously carry out disinfection.

Now, the process for producing a tinted contact lens according to the present invention will be described in further detail with reference to Examples. However, it should be understood that the present invention is by no means restricted to such specific Examples.

EXAMPLE 1

As a solubilised vat dye, 0.1 g of soluble vat blue 6 was added to a mixed solution comprising 60 g of N,N-dimethylacrylamide and 20 g of N-vinyl-2-pyrrolidone, and ultrasonic waves were applied thereto. Then, the mixture was left to stand for a while and dissolved. The solution was red brown.

To this solution, 50 g of methyl methacrylate, 30 g of polymethyl methacrylate containing intramolecular polymerizable groups, 0.1 g of ethylene glycol dimethacrylate and 0.1 g of α,α'-azobisisobutyronitrile were added and dissolved, and the solution was subjected to filtration under pressure. By that time, the monomer mixture underwent color change to dark blue. Then, polymerization was carried out in a glass test tube, and the obtained polymer was cut and ground into a lens shape. The lens-shaped polymer is immersed in distilled water and boiled for 5 hours to obtain a uniformly blue-tinted soft contact lens.

Then, the obtained tinted contact lens was continuously boiled for 200 hours, whereby no fading or discoloration was observed before or after the boiling.

Further, the change in the absorbance before and after the boiling was examined, whereby with light rays having a wavelength of 602 nm, the absorbance before boiling was 0.140, while the absorbance after boiling was 0.133, and thus no substantial change was observed.

EXAMPLE 2

As a solubilised vat dye, 0.15 g of soluble vat brown 1 was added to 60 g of N,N-dimethyl acrylamide, and ultrasonic waves were applied thereto, and the mixture was left to stand for a while and dissolved.

The solution was dark brown. To this solution, 20 g of N-vinyl-2-pyrrolidone, 10 g of methyl methacrylate, 20 g of polymethyl methacrylate containing intramolecular polymerizable groups, 0.1 g of ethylene glycol dimethacrylate and 0.1 g of α,α'-azobisisobutyronitrile were added and dissolved. Then, the solution was subjected to filtration under pressure.

Then, the solution was subjected to the same treatment as in Example 1 to obtain a brown-tinted soft contact lens.

The obtained soft contact lens was visually inspected, whereby it was found to be uniformly tinted brown, and no color shading was observed.

Then, in the same manner as in Example 1, the obtained tinted contact lens was continuously boiled for 200 hours, whereby no fading or discoloration was observed before or after the boiling.

EXAMPLE 3

As a solubilised vat dye, 0.06 g of soluble vat blue 6 was added to 50 g of N,N-dimethyl acrylamide, and the mixture was stirred for 3 hours and left to stand for a while and dissolved. The solution was reddish brown.

To this solution, 20 g of tris(trimethylsiloxy)silylpropyl methacrylate, 20 g of polydimethylsiloxane containing intramolecular polymerizable groups, 0.3 g of ethylene glycol dimethacrylate and 0.1 g of 2,2'-azobis(2,4-dimethylvaleronitrile) were added and dissolved. Then, the mixture was subjected to filtration under pressure. By this time, the monomer mixture underwent color change to dark blue.

Then, the solution was subjected to the same treatment as in Example 1 to obtain a blue-tinted soft contact lens.

The obtained soft contact lens was visually inspected, whereby it was found to be uniformly tinted, and no color shading was observed.

Then, in the same manner as in Example 1, the obtained tinted contact lens was continuously boiled for 200 hours, whereby no fading or discoloration was observed before or after the boiling.

Comparative Example 1

With a composition similar to Example 1, a polymer containing no solubilised vat dye was prepared, and it was cut and processed into a shape of a contact lens. This water-absorptive contact lens in a xerogel state was immersed in a dyeing solution comprising 0.03 part by weight of soluble vat blue 6, 50 parts by weight of distilled water, 50 parts by weight of ethanol, 0.5 part by weight of sodium hydrogencarbonate and 0.5 part by weight of sodium sulfite with stirring for 90 minutes to carry out dyeing of the contact lens.

At this stage, the soft contact lens was tinted yellow. The peripheral portion of the lens was deeply dyed, the lens was not uniformly dyed. This lens was rinsed with distilled water and then boiled for 5 hours, whereby in few minutes the lens underwent color change from yellow→reddish purple→bluish purple, and fading was observed. The distilled water used for boiling was colored reddish purple, and the obtained soft contact lens was slightly bluish, but it was not a practically satisfactory tinted soft contact lens.

Comparative Example 2

The contact lens dyed in the same manner as in Comparative Example 1, was immersed in a 1 wt % sulfuric acid aqueous solution, whereby the contact lens underwent color development to brown. This colored contact lens was rinsed with distilled water and then boiled for 5 hours. It was tinted with a sufficient density, but the peripheral portion was deeply tinted and the central portion was slightly tinted, i.e. the contact lens was not uniformly tinted.

According to the process for producing a tinted contact lens of the present invention, it is possible to obtain a tinted contact lens which is uniformly tinted without color shading and which is not susceptible to discoloration or fading even by cleaning treatment or boiling treatment.

What is claimed is:

1. A process for producing a tinted contact lens, which comprises:
   (a) dissolving a solubilised vat dye in one or more monomers capable of dissolving the solubilised vat dye therein, said one or more monomers comprising, at least, N,N,-dimethyl acrylamide or N,N-dimethyl-(meth)acrylamide;
   (b) mixing the one or more monomers having said solubilised vat dye dissolved therein and other monomers;
   (c) polymerizing the monomer mixture; and
   (d) processing the resulting polymer into a shape of a contact lens.

2. The process of claim 1, wherein the solubilised vat dye is an alkali metal salt of a leuco sulfate ester of a vat dye selected from the group consisting of anthraquinone, anthrone, indigo and thioindigo.

3. The process of claim 1, wherein the concentration of the solubilised vat dye in the monomer mixture is from 0.01 to 1 wt % based on the total weight of the monomers to be polymerzied.

4. The process of claim 1, wherein the monomer capable of dissolving the solublised vat dye therein is N,N-dimethyl (meth) acrylamide.

5. The process of claim 1, wherein the monomer capable of dissolving the solubilised vat dye is N,N-dimethyl acrylamide.

6. The process of claim 1, wherein said leuco sulfate ester is selected from the group consisting of 7, 16-dichloro-6, 15-dihydro-5,9,14,18-anthrazinetetrone, 16,23-dihydrodinaphtho (2,3-a:2',3'-i) naphth (2',3':6,7) indole (2,3-c) carbazole -5,10,15,17,22, 24-hexone, N,N'-(9,10-dihydro-9,10-dioxo-1,5-anthracenediyl) bisbenzamide, 16,17-dimethoxydinaphtho (1,2,3-cd:3',2'1'-1n) perylene-5,10-dione and 6-ethoxy-2-(6-ethoxy-3-oxobenzo (b) thien-2(3H)-ylidene) genzo (b) thiophen-3-(2H) one.

7. The process of claim 3, wherein the concentration of the solubilised vat dye in the monomer mixture is from 0.03 to 0.3 wt. %.

8. The process of claim 1, wherein said other monomers are hydrophilic monomers selected from the group consisting of N-vinyl-2-pyrrolidone, 2-hydroxyethyl (meth)acrylate and (meth)acrylic acid.

9. The process of claim 1, wherein said other monomers are hydrophobic monomers selected from the group consisting of methyl (meth)acrylate, styrene, t-butylstyrene, trifluoroethyl (meth) acrylate, hexafluoroisopropyl (meth) acrylate and tris (trimethylsiloxy) silyl propyl (meth) acrylate.

10. The process of claim 8 or 9, which further comprises adding monomers selected from the group consisting of ethylene glycol di(meth)acrylate, ally (meth)acrylate, divinylbenzene and vinylbenzyl (meth)acrylate.

* * * * *